(12) United States Patent
Hawk et al.

(10) Patent No.: US 7,263,875 B2
(45) Date of Patent: Sep. 4, 2007

(54) MULTI-LAYER WINDSHIELD MOISTURE DETECTOR

(75) Inventors: Allan Rex Hawk, Cheswick, PA (US); Kwaku Koi Koram, Wexford, PA (US); Shelby Chun, Mt. Lebanon, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/503,615

(22) Filed: Aug. 14, 2006

(65) Prior Publication Data

US 2006/0272397 A1    Dec. 7, 2006

Related U.S. Application Data

(63) Continuation-in-part of application No. 10/963,172, filed on Oct. 11, 2004, now Pat. No. 7,204,130.

(51) Int. Cl.
*G01N 5/02* (2006.01)
(52) U.S. Cl. .......................................................... 73/73
(58) Field of Classification Search ............... 73/73, 73/74; 318/443, 444, 445, 446, 447, 448
See application file for complete search history.

(56) References Cited

U.S. PATENT DOCUMENTS

| | | | | |
|---|---|---|---|---|
| 3,826,979 A | * | 7/1974 | Steinmann | 361/178 |
| 4,100,398 A | * | 7/1978 | Levin | 219/541 |
| 4,323,726 A | | 4/1982 | Criss et al. | 174/68.5 |
| 4,428,232 A | | 1/1984 | Tanaka et al. | 73/304 C |
| 4,560,923 A | | 12/1985 | Hanson | 324/61 QL |
| 4,703,237 A | * | 10/1987 | Hochstein | 318/483 |
| 4,748,390 A | * | 5/1988 | Okushima et al. | 318/483 |
| 4,827,198 A | * | 5/1989 | Mueller et al. | 318/483 |
| 4,859,986 A | * | 8/1989 | Van Auken et al. | 473/467 |

(Continued)

FOREIGN PATENT DOCUMENTS

AU    6895194    2/1995

(Continued)

OTHER PUBLICATIONS

PCT Application Serial No. PCT/US02/06163 filed Feb. 28, 2002.

(Continued)

*Primary Examiner*—Jewel Thompson
(74) *Attorney, Agent, or Firm*—Andrew C. Siminerio

(57) ABSTRACT

A moisture detection system includes a moisture detector having a first electrical conductor, a first substrate having the first electrical conductor disposed on one surface thereof, a spacing layer coupled to the other surface of the first substrate, a second substrate having one surface thereof coupled to a surface of the spacing layer opposite the first substrate, and an electrically conductive layer disposed on a surface of a substrate opposite the spacing layer. A second electrical conductor can be disposed on the same surface of the first substrate as the first electrical conductor. The first and second electrical conductors can define interdigitated fingers. Circuitry is provided for stimulating the first electrical conductor with a predetermined frequency oscillator signal and for outputting a control signal that is responsive to the response of the first electrical conductor to the oscillator signal and an amount of moisture adjacent the first electrical conductor.

21 Claims, 8 Drawing Sheets

U.S. PATENT DOCUMENTS

| | | | |
|---|---|---|---|
| 5,033,672 A * | 7/1991 | Sakamoto et al. | 236/44 A |
| 5,598,146 A | 1/1997 | Schroder | 340/602 |
| 5,602,333 A | 2/1997 | Larrabee et al. | 73/149 |
| 5,653,904 A | 8/1997 | Adlparvar et al. | 219/203 |
| 5,659,294 A | 8/1997 | Schroder | 340/602 |
| 5,661,303 A | 8/1997 | Teder | 250/341.8 |
| 5,668,478 A | 9/1997 | Bischur | 324/690 |
| 5,672,976 A | 9/1997 | Egger et al. | 324/668 |
| 5,682,788 A | 11/1997 | Netzer | 73/73 |
| 5,694,012 A | 12/1997 | Pientka et al. | 318/444 |
| 5,703,568 A | 12/1997 | Hegyi | 340/602 |
| 5,751,071 A | 5/1998 | Netzer | 307/10.1 |
| 5,780,718 A | 7/1998 | Weber | 73/29.01 |
| 5,780,719 A | 7/1998 | VanDam | 73/29.01 |
| 5,783,743 A | 7/1998 | Weber | 73/29.01 |
| 5,801,307 A | 9/1998 | Netzer | 73/170.17 |
| 5,818,341 A | 10/1998 | Saurer et al. | 340/602 |
| 5,900,821 A | 5/1999 | Pretzold | 340/604 |
| 5,990,647 A | 11/1999 | Zettler | 318/483 |
| 6,052,196 A | 4/2000 | Pientka et al. | 356/445 |
| 6,066,933 A | 5/2000 | Ponziana | 318/483 |
| 6,084,519 A | 7/2000 | Coulling et al. | 340/602 |
| 6,094,981 A | 8/2000 | Hochstein | 73/170.17 |
| 6,118,383 A | 9/2000 | Hegyi | 340/602 |
| 6,207,967 B1 | 3/2001 | Hochstein | 250/574 |
| 6,218,741 B1 | 4/2001 | Braun et al. | 307/10.1 |
| 6,232,603 B1 | 5/2001 | Nelson | 250/339.11 |
| 6,250,148 B1 | 6/2001 | Lynam | 73/170.17 |
| 6,262,407 B1 | 7/2001 | Teder | 250/205 |
| 6,262,410 B1 | 7/2001 | Stam et al. | 250/208.1 |
| 6,268,612 B1 | 7/2001 | Teder | 250/574 |
| 6,313,457 B1 | 11/2001 | Bauer et al. | 250/214 C |
| 2002/0189329 A1 | 12/2002 | Wimmer | |
| 2005/0115308 A1 | 6/2005 | Koram et al. | |

FOREIGN PATENT DOCUMENTS

| | | |
|---|---|---|
| DE | 101 27 978 | 11/2002 |
| DE | 101 27 990 | 12/2002 |
| DE | 101 28 010 | 1/2003 |
| EP | 0 308 990 | 3/1989 |
| EP | 0 638 822 | 2/1995 |
| EP | 0 890 143 B1 | 12/2001 |
| EP | 1 264 746 | 5/2002 |
| JP | 55063940 A | 5/1980 |
| JP | 04184226 A | 7/1992 |
| JP | 09043187 | 2/1997 |
| WO | WO98/30922 | 7/1998 |
| WO | 01/81931 A1 | 11/2001 |
| WO | WO2004/050442 | 6/2004 |
| WO | 2005/029134 A1 | 3/2005 |
| WO | WO 2006/122942 | 11/2006 |
| WO | WO 2006/122943 | 11/2006 |

OTHER PUBLICATIONS

International Search Report mailed Sep. 9, 2004.
International Search Report and Written Opinion of the International Searching Authority mailed on Feb. 20, 2006, corresponding to International Application No. PCT/US2005/036486, filed Oct. 11, 2005, Koram et al.

* cited by examiner

MULTI-LAYER WINDSHIELD MOISTURE DETECTOR

CROSS REFERENCE TO RELATED APPLICATION

This application is a continuation-in-part of U.S. patent application Ser. No. 10/963,172, filed Oct. 11, 2004 now U.S. Pat. No. 7,204,130, which is incorporated herein by reference.

BACKGROUND OF THE INVENTION

1. Field of the Invention

The present invention relates to moisture detection and, more particularly, to moisture detection on a vehicle windshield.

2. Description of the Prior Art

Heretofore, the detection of moisture on a windshield of a vehicle was accomplished in four basic manners. Namely, capacitive sensor systems, resistive sensor systems, ultrasonic sensor systems and optical sensor systems.

A capacitive sensor system includes a capacitor formed on the windshield. In response to moisture on the windshield, the capacitance of the capacitor changes. A sensing circuit is connected to detect the changing capacitance and to control the operation of a windshield wiper as a function of the changing capacitance. Examples of capacitive moisture sensors include U.S. Pat. No. 5,668,478 to Buschur; U.S. Pat. No. 5,682,788 to Netzer; U.S. Pat. No. 5,801,307 to Netzer; and U.S. Pat. No. 6,094,981 to Hochstein.

A resistive measurement system includes two conductive elements disposed in spaced relation on the windshield, or another part of the vehicle, such as a conventional whip antenna. Circuitry coupled to the conductive elements measures a change in resistance thereof in response to water bridging the resistive elements and controls the operation of the windshield wiper as a function of the change in resistance. Examples of resistive measurement systems include U.S. Pat. No. 5,659,294 to Schroder; U.S. Pat. No. 5,598,146 to Schroder; U.S. Pat. No. 5,780,718 to Weber; U.S. Pat. No. 5,780,719 to VanDam; U.S. Pat. No. 5,783,743 to Weber; and U.S. Pat. No. 5,900,821 to Petzold.

An ultrasonic sensor system includes a transducer which emits an ultrasonic signal toward a first face of a sheet and receives a reflected ultrasonic signal on a second face of the sheet. The variation in the reflected signal is utilized to determine the presence or absence of foreign bodies on the second face of the sheet. Examples of ultrasonic sensor systems include U.S. Pat. No. 5,818,341 to Saurer et al. and European Publication No. EP0638822.

An optical sensor system includes a light detector positioned to detect light reflected off a windshield from a light source. In response to the presence of moisture on the windshield, the amount of light detected by the light sensor will change due to changing reflection of the light from the light source, thus causing a change in the output of the light sensor. Detecting circuitry detects the change in output from the light detector in response to the change in light impinging thereon and operates the windshield wiper as a function of the change. Examples of light detecting systems include U.S. Pat. No. 5,694,012 to Pientka et al.; U.S. Pat. No. 5,990,647 to Zettler; U.S. Pat. No. 6,052,196 to Pientka et al.; U.S. Pat. No. 6,066,933 to Ponziana; U.S. Pat. No. 6,084,519 to Coulling et al.; U.S. Pat. No. 6,207,967 to Hochstein; U.S. Pat. No. 5,661,303 to Teder; U.S. Pat. No. 6,250,148 to Lynam; U.S. Pat. No. 6,218,741 to Braun et al.; and U.S. Pat. No. 6,232,603 to Nelson.

A problem with a capacitive sensor system includes the need to form a capacitor having sufficient capacitance whereupon the change in capacitance in response to the presence of rain on the windshield can be detected by suitable detection circuitry. Another problem with a capacitive sensor system is that the capacitance of the capacitor can change during use in response to heating or cooling of the metal films forming the capacitor.

A problem with a resistive sensor system includes the need to have the resistive elements formed on the outer surface of the windshield whereupon the resistive elements are exposed to weather and possible deterioration. In addition, the resistive elements of a resistive sensor system are also subject to changes in resistance due to changes in the temperature.

A problem with an ultrasonic sensor system and an optical sensor system includes the need to position the transducer of the ultrasonic sensor system and the light transmitter and light receiver of the optical sensor system inside the vehicle to detect the presence of moisture at a suitable location on the exterior of the windshield. However, such positioning often results in partially blocking a driver's view through the windshield or in the positioning of such sensor system at less than an optimal location for detecting the presence of moisture on the windshield. Moreover, the sensitivity of an optical sensor to detect moisture can be compromised by the color or shade of the windshield in the path of the light propagating from the light transmitter to the light receiver.

It would, therefore, be desirable to provide a small moisture detector disposed on a flexible substrate that is coupled to a sheet, such as a windshield. The moisture detector can be coupled to circuitry for stimulating the moisture detector and circuitry for detecting a change in a characteristic of the moisture detector due to the presence of moisture on the sheet. It would also be desirable to provide a method for detecting the change of the characteristic of the moisture detector as a function of the temperature of the sheet.

SUMMARY OF THE INVENTION

The invention is a moisture detection system that includes: a moisture detector including a first electrical conductor disposed on a surface of a first substrate and having a resonant frequency that varies as a function of an amount of moisture present adjacent the first electrical conductor, an electrically conductive layer disposed on the surface of a second substrate, and a spacing layer disposed between the first and second substrates for maintaining at least portions of the first electrical conductor and the electrically conductive layer in spaced relation; an oscillator which outputs an oscillator signal at a predetermined frequency; a resonator circuit coupled to the first electrical conductor and responsive to the oscillator signal for outputting a resonator signal having an amplitude related to the resonant frequency of the first electrical conductor and the predetermined frequency; a filter circuit responsive to the resonator signal for outputting a rectified and filtered signal; an analog-to-digital converter responsive to the rectified and filtered signal for outputting a digital signal related to the rectified and filtered signal; and a controller responsive to the digital signal for causing another system to operate in accordance with the digital signal.

The other system can be a wiper system that is responsive to the controller for adjusting a rate moisture is removed from adjacent the first electrical conductor as a function of an amount of moisture present adjacent the first electrical conductor and/or a rate moisture accumulates adjacent the first electrical conductor.

At least part of the moisture detector can be laminated between a pair of transparent sheets. More specifically, the part of the moisture detector where the portions of the first electrical conductor and the electrically conductive layer are maintained in spaced relation by the spacing layer can be laminated between a pair of transparent sheets.

At least one of the first and second substrates is flexible.

A second electrical conductor can be provided. Each electrical conductor can define a plurality of spaced fingers. Fingers of the first and second electrical conductors can be interdigitated. In one exemplary non-limiting embodiment, a pair of fingers of the first electrical conductor can be disposed in spaced relation between two pairs of fingers of the second electrical conductor and each pair of fingers of the second electrical conductor can be disposed in spaced relation between the pair of fingers of the first electrical conductor and one other finger of the first electrical conductor.

Each finger can have an elongated quadrilateral shape with the opposing ends thereof having different lengths.

A temperature sensor can be disposed on the second substrate for detecting a temperature adjacent one of the fingers of at least one of the electrical conductors.

The invention is also a moisture detection system. The moisture detection system includes a moisture detector including a spacing layer disposed between a first printed circuit layer having a first electrical conductor disposed on a surface of a substrate thereof and a second printed circuit layer having an electrically conductive layer disposed on the surface of a substrate thereof, the spacing layer maintaining at least a portion of the first electrical conductor and at least a portion of the electrically conductive layer in spaced relation. An oscillator is provided for outputting to the first electrical conductor an oscillator signal at a predetermined frequency. Circuitry is provided that is responsive to the oscillator signal for outputting a resonator signal having an amplitude related to the resonant frequency of the first electrical conductor. Lastly, circuitry is provided that is responsive to the resonator signal for outputting a control signal related to an amplitude of the resonator signal.

The first printed circuit layer can include a second electrical conductor disposed on the surface of the substrate thereof in spaced relation to the first electrical conductor. The second electrical conductor is desirably coupled to a reference voltage.

The first electrical conductor can define a first plurality of fingers that extend in spaced relation from an edge of the substrate of the first printed circuit layer. The second electrical conductor can define a second plurality of fingers that extend in spaced relation toward the edge of the substrate of the first printed circuit layer. The first and second plurality of fingers can be interdigitated with each other.

The first and second plurality of fingers can be interdigitated as follows: a pair of fingers of the first electrical conductor is disposed in spaced relation between two pairs of fingers of the second electrical conductor; and each pair of fingers of the second electrical conductor is disposed in spaced relation between the pair of fingers of the first electrical conductor and one other finger of the first electrical conductor.

Each finger can have an elongated quadrilateral shape. The opposing ends of each finger can have different lengths.

The surfaces on which the first electrical conductor and the electrically conductive layer are disposed desirably face away from each other.

The electrically conductive layer can be made from indium-tin oxide.

The combination of the first and second printed circuit layers and the spacing layer disposed therebetween can be sandwiched between an inner glass ply and an outer glass ply of a vehicle windshield. The first electrical conductor desirably faces the outer glass ply while the electrically conductive layer desirably faces the inner glass ply.

The electrically conductive layer can be connected to a reference voltage.

Lastly, the invention is a moisture detection system comprising a moisture detector including: a first electrical conductor; a first substrate having the first electrical conductor disposed on one surface thereof; a spacing layer coupled to the other surface of the first substrate; a second substrate having one surface thereof coupled to a surface of the spacing layer opposite the first substrate; and an electrically conductive layer disposed on a surface of a substrate opposite the spacing layer.

The spacing layer can be formed from an electrically non-conductive material.

A second electrical conductor can be disposed on the same surface of the first substrate as the first electrical conductor. The first and second electrical conductors can define interdigitated fingers.

DETAILED DESCRIPTION OF THE INVENTION

The present invention will be described with reference to the accompanying figures where like reference numbers correspond to like elements.

Figure 1:
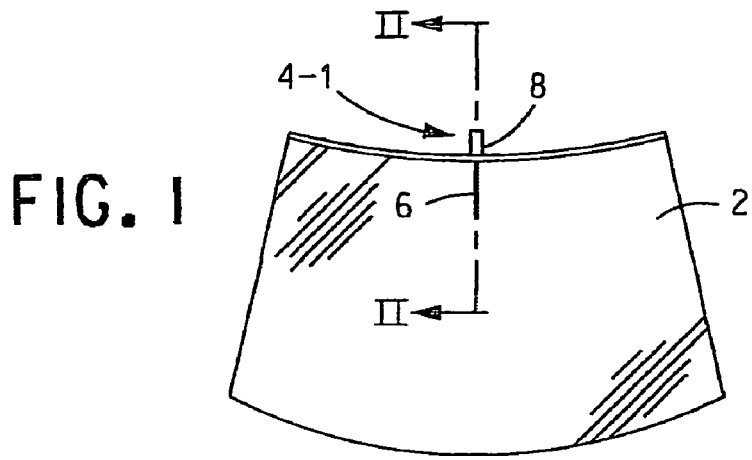
FIG. 1 is a plan view of a sheet, such as a sheet of glass or a windshield, including a first embodiment moisture detector for detecting moisture on the sheet.

With reference to FIG. 1, a sheet or panel of optically transparent material, such as a sheet of glass or a vehicle windshield 2, includes a moisture detector 4 disposed thereon. A first embodiment of moisture detector 4-1 includes one or more electrical conductors 6 connected to a conductive foil 8 which is utilized for connecting electronic circuitry to electrical conductor 6. In the embodiment shown in FIG. 1, foil 8 is shown extending outside the periphery of windshield 2. However, this is not to be construed as limiting the invention since foil 8 may be disposed entirely within the periphery of windshield 2.

Figure 2:
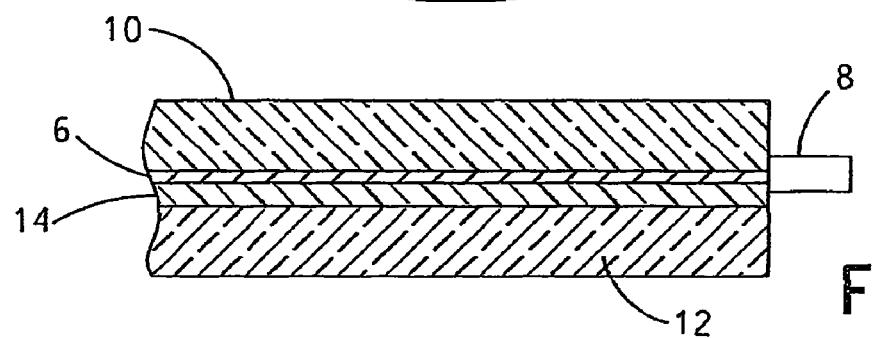
FIG. 2 is a cross section taken along lines II-II in FIG. 1.

With reference to FIG. 2 and with continuing reference to FIG. 1, windshield 2 is desirably formed by outer and inner glass plies 10 and 12 bonded together by a plastic interlayer 14, such as polyvinylbutyral, to form windshield 2 as a unitary structure. Plies 10 and 12, however, may be other transparent rigid material, such as polycarbonate. Each electrical conductor 6 can be disposed on an inward or an outward facing surface of glass ply 10 or glass ply 12. Each electrical conductor 6 can be a conductive wire or sheet, a conductive coating applied to one of the surfaces of glass ply 10 or glass ply 12 in the form of a line or a sheet, or a dispersion of electrically conductive particles applied to one of the surfaces of glass ply 10 or glass ply 12 in the form of a line or a sheet. Desirably, each electrical conductor 6 has a width and/or thickness that renders it essentially invisible to the naked eye.

Figure 3:
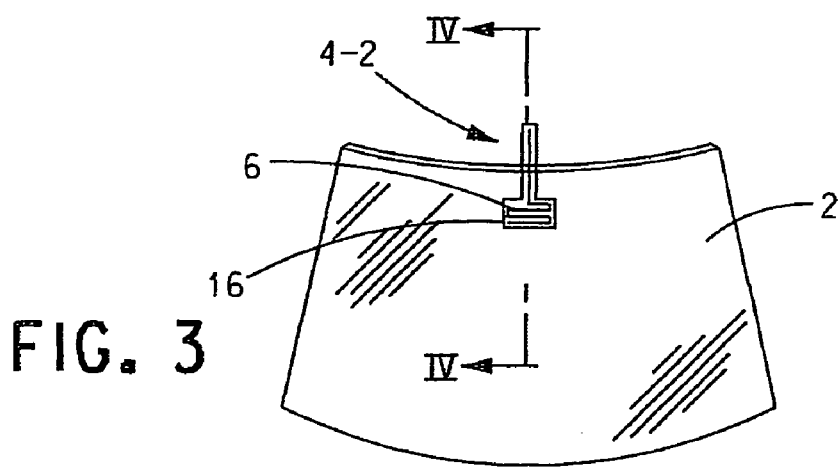
FIG. 3 is a plan view of a sheet, such as a sheet of glass or a windshield, including a second embodiment moisture detector for detecting moisture on the sheet.
Figure 4:
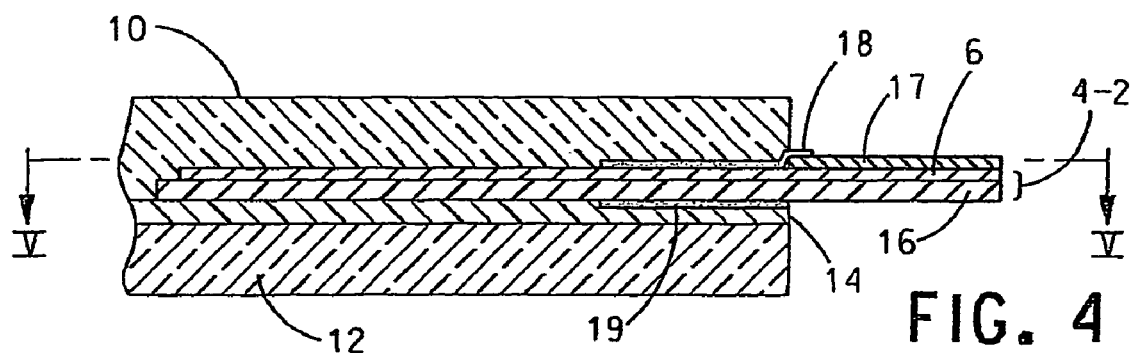
FIG. 4 is a cross section taken along lines IV-IV in FIG. 3.
Figure 5:
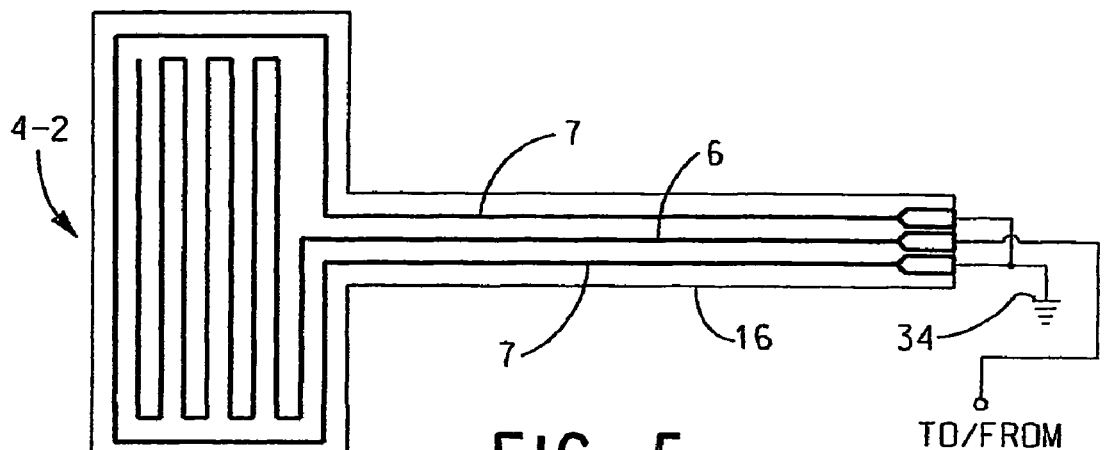
FIG. 5 is a cross section taken along lines V-V in FIG. 4.

With reference to FIGS. 3-5, a second embodiment moisture detector 4-2 includes one or more electrical conductors 6 disposed on a flexible substrate 16. In FIGS. 3 and 4, part of flexible substrate 16 including electrical conductor(s) 6 disposed thereon extends outside the periphery of windshield 2 to facilitate connection of electronic circuitry (described hereinafter) to electrical conductor(s) 6. However, this is not to be construed as limiting the invention since flexible substrate 16 having electrical conductor(s) 6 disposed thereon may be disposed entirely within the periphery of windshield 2.

Flexible substrate 16 can be sandwiched between glass plies 10 and 12 with electrical conductor 6 facing an inward facing surface of glass ply 10 or glass ply 12, or one of the outward facing surfaces of plastic interlayer 14. Alternatively, flexible substrate 16 can be disposed on an outward facing surface of glass ply 10 or glass ply 12 with electrical conductor 6 facing toward or away from said outward facing surface. To avoid undesirable exposure of flexible substrate 16 and/or electrical conductor(s) 6, it is more desirable to sandwich flexible substrate 16 between glass plies 10 and 12 versus positioning flexible substrate 16 on an outward facing surface of glass ply 10 or glass ply 12.

Flexible substrate 16 can be formed from any suitable flexible and insulative material, such as polyethyleneterephthalate, polyvinylbutyral, ultra-thin glass, etc. A desired pattern of electrical conductor(s) 6 can be formed from a sheet of any suitable electrically conductive material adhered to flexible substrate 16 utilizing conventional photolithographic processing techniques. The desired pattern of electrical conductor(s) 6 can also be formed on flexible substrate 16 by screen printing or ink jetting a suitable conductive material in the desired pattern on flexible substrate 16. The foregoing methods of forming the pattern of electrical conductor(s) 6 on flexible substrate 16 are not to be construed as limiting the invention since the use of any suitable means or method for forming the desired pattern of electrical conductor(s) 6 on flexible substrate 16 is envisioned.

Figure 6:
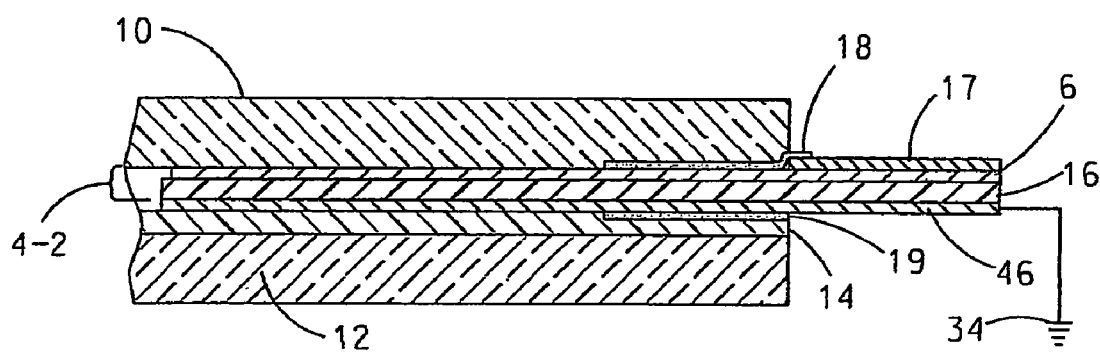
FIG. 6 is a cross section of the second embodiment moisture detector shown in FIG. 4 including a conductive material positioned on a side of the substrate opposite the electrical conductor.

With reference to FIGS. 5 and 6 and with continuing reference to FIGS. 3 and 4, the portion of flexible substrate 16 extending outside the periphery of windshield 2 can have electrical conductor(s) 6 sandwiched between flexible substrate 16 and an insulative material 17 adhered to electrical conductor(s) 6. Insulative material 17 can be formed from a sheet of suitable insulative material, such as Kapton® (a registered trademark of E.I. DuPont de Nemoirs and Company Corporation, Wilmington, Del.), or any other suitable solid or liquid insulative material that acts to protect electrical conductor(s) 6. Since the portions of electrical conductor(s) 6 and substrate 16 sandwiched between glass plies 10 and 12 are protected thereby from moisture and/or particulate contaminants, an end of insulative material 17 desirably terminates between glass plies 10 and 12.

To avoid exposure of electrical conductor(s) 6 sandwiched between glass plies 10 and 12 to moisture and/or particulate contaminates, a thermoset adhesive 18 can be disposed on the electrical conductor 6 side of flexible substrate 16 positioned between glass plies 10 and 12. This thermoset adhesive 18 desirably covers the end of insulative material 17 sandwiched between glass plies 10 and 12 and extends between glass plies 10 and 12 a sufficient distance so that when it is cured, thermoset adhesive 18 forms with glass plies 10 and 12 and plastic interlayer 14 a hermetic seal that inhibits moisture and/or particulate contaminates from contacting the portion of electrical conductor(s) 6 sandwiched between glass plies 10 and 12.

A pressure sensitive adhesive 19 can be disposed between flexible substrate 16 and plastic interlayer 14 for securing the position of flexible substrate 16 between glass plies 10 and 12 prior to exposing thermoset adhesive 18 and plastic interlayer 14 to a curing heat.

As shown in FIG. 5, flexible substrate 16 can include a ground conductor 7 that at least partially surrounds electrical conductor(s) 6. Connecting ground conductor 7 to an external reference voltage 34, such as a reference ground, forms a ground loop around electrical conductor(s) 6. This ground loop avoids undesirable electromagnetic interference from affecting the operation of electrical conductor(s) 6 acting as a resonating element of moisture detector 4-2. Moreover, as shown in FIG. 6, a side of flexible substrate 16 opposite electrical conductor(s) 6 can also or alternatively include a conductive material 46 disposed thereon that can be connected to external reference voltage 34. Conductive material 46 can be in the form of a sheet, one or more lines, a mesh, or any other suitable form that defines a faraday shield that avoids undesirable electromagnetic interference from affecting the operation of electrical conductor(s) 6 acting as the resonating element of moisture detector 4-2.

Figure 7:
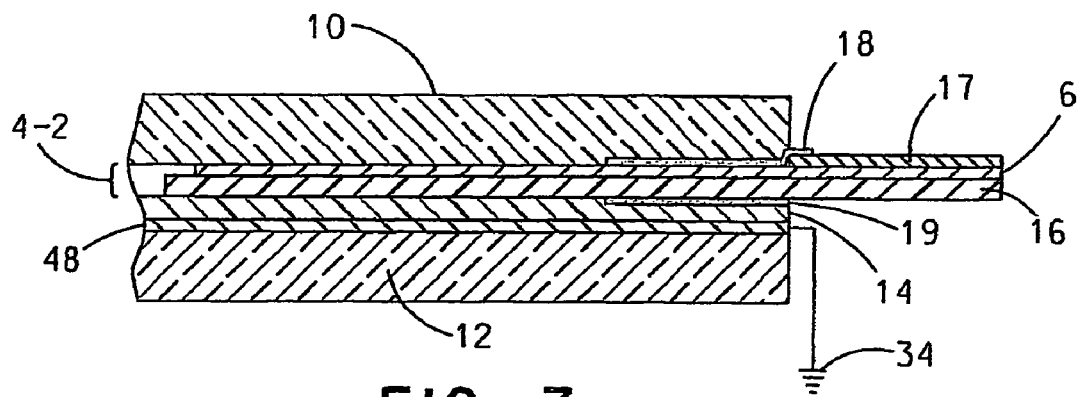
FIG. 7 is a cross section of the second embodiment moisture detector shown in FIG. 4 including an electrically conductive coating on the inside surface of one of the sheets of glass.

With reference to FIG. 7 and with continuing reference to FIGS. 3-6, an electrically conductive coating 48 can also or alternatively be formed on a surface, e.g., inner surface, of glass ply 12 and connected to reference voltage 34 for avoiding undesirable electromagnetic interference from affecting the operation of electrical conductor(s) 6 acting as the resonating element of moisture detector 4-2. Electrically conductive coating 48 can be transparent or colored. When colored, electrically conductive coating 48 can serve the dual purpose of a ground plane or faraday shield for moisture detector 4-2 and a sun shade of windshield 2. While described in connection with the second embodiment moisture detector 4-2, it is to be appreciated that electrically conductive coating 48 can also be disposed on a surface, e.g., inner surface, of glass ply 12 when utilized with the first embodiment moisture detector 4-1 shown in FIGS. 1 and 2. As can be seen, any one or a combination of ground conductor 7, conductive material 46 and/or electrically conductive coating 48 can be utilized for avoiding undesirable electromagnetic interference from affecting the operation of electrical conductor(s) 6 acting as the resonating element of moisture detector 4-2.

Alternatively, substrate 16 can be omitted and one or more of conductor(s) 6 and 7 comprising the second embodiment moisture detector 4-2 can be disposed directly one or more surfaces of glass ply 10, glass ply 12 and/or interlayer 14 in any desired arrangement deemed suitable and/or desirable by one of ordinary skill in the art. Electrically conductive coating 48 can also be utilized in combination with conductor(s) 6 and/or 7 of the second embodiment moisture detector 4-2 when conductor(s) 6 and/or 7 are disposed directly on one or more surfaces of glass ply 10, glass ply 12 and/or interlayer 14.

Figure 8:
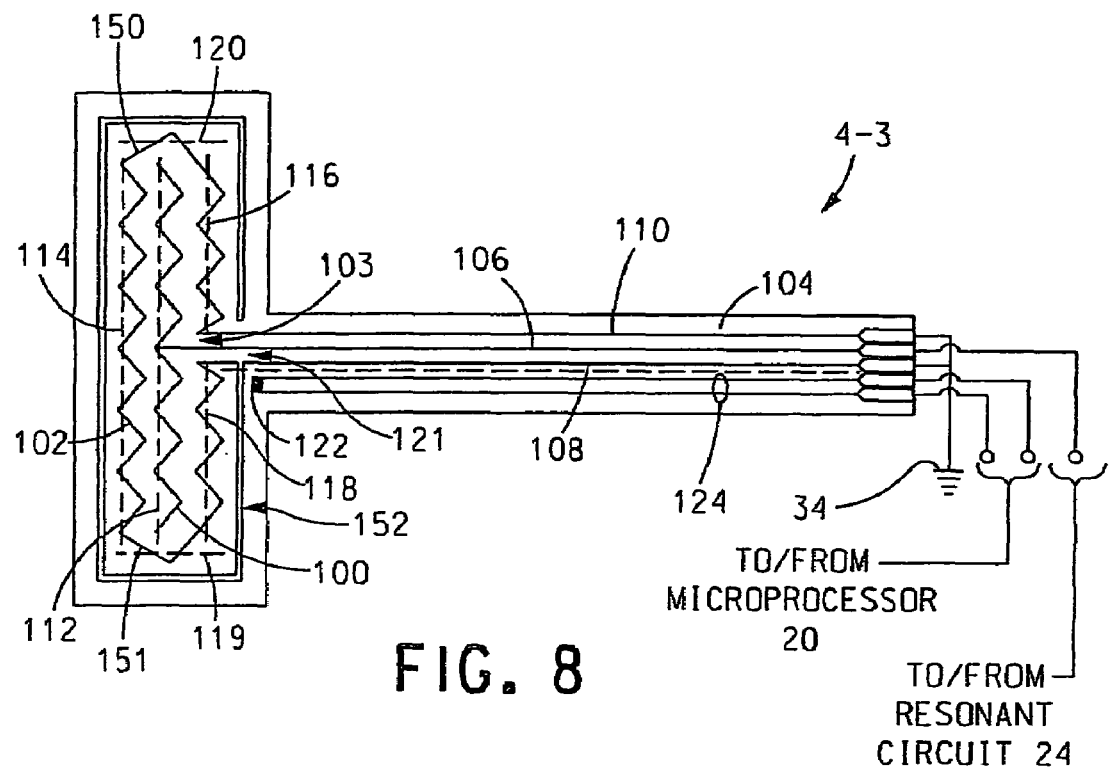
FIG. 8 is a plan view of a third embodiment moisture detector for detecting moisture on the sheet.

With reference to FIG. 8, and with continuing reference to FIGS. 1-7, a third embodiment moisture detector 4-3 includes a first elongated electrical conductor 100 and a second elongated electrical conductor 102 disposed on a flexible substrate 104. Second conductor 102 can at least partially surround first conductor 100 defining a gap 103 between the ends of second conductor 102. A power conductor 106 can also be disposed on substrate 104. Power conductor 106 is electrically connected to first conductor 100 intermediate the ends thereof via gap 103 between the ends of second conductor 102. A ground conductor 108 can also be disposed on substrate 104. Ground conductor 108 is electrically connected to one end of second conductor 102. Another ground conductor 110 can be disposed on substrate 104 and can be electrically connected to the other end of second conductor 102.

First conductor 100 defines a longitudinal axis 112 and at least the portion of second conductor 102 disposed on a side of first conductor 100 opposite gap 103 defines a longitudinal axis 114 that is positioned in spaced parallel relation with longitudinal axis 112 of first conductor 100. The portions of second conductor 102 on opposite sides of gap 103 also define longitudinal axes 116 and 118 that are positioned in spaced parallel relation with longitudinal axis 112 of first conductor 100. Longitudinal axes 112-118 are shown in phantom in FIG. 8. First conductor 100 and second conductor 102 define zigzag paths along their longitudinal axes 112 and 114-118. As shown, these zigzag paths track each other in substantially spaced parallel relation along their longitudinal axes.

Portions of second conductor 102 spaced from opposite ends of first conductor 100 define longitudinal axes 119 and 120 (shown in phantom) that are positioned substantially perpendicular to longitudinal axis 112 of first conductor 100. As shown, portions 119 and 120 of second conductor 102 define mirror image zigzag paths spaced from the opposite ends of first conductor 100.

Desirably, ground conductor 108 defines a straight line connection to second conductor 102 as shown by the phantom line adjacent ground conductor 108. Optionally, ground conductor 108 at least partially surrounds second conductor 102. In the illustrated embodiment of moisture detector 4-3, the optional configuration of ground conductor 108 has a generally rectangular form surrounding second conductor 102. However, this is not to be construed as limiting the invention. The optional configuration of ground conductor 108 defines a gap 121 for passage of power conductor 106 for electrical connection to first conductor 100. Gap 121 is also used for passage of ground conductor 110 for electrical connection to second conductor 102.

Optionally, a temperature sensor 122 is disposed on substrate 104 adjacent first and second conductors 100 and 102, respectively. Conductors 124 are connected to temperature sensor 122 to facilitate connection of sensor 122 to suitable sensing circuitry (described hereinafter).

Substrate 104 of the third embodiment moisture detector 4-3 can be formed from the same material(s) as substrate 16 of the second embodiment moisture detector 4-2. The pattern of conductors 100, 102, 106, 108, 110 and 124 can also be formed on flexible substrate 104 in the manner described in connection with the formation of conductor(s) 6 and 7 on substrate 16 of the second embodiment of moisture detector 4-2. Accordingly, details regarding how the pattern of electrical conductors 100, 102, 106, 108 and 110 and 124 are formed on substrate 104 will not be described herein to avoid unnecessary redundancy.

Third embodiment moisture detector 4-3 including substrate 104 can be sandwiched between glass plies 10 and 12 in the manner discussed above in connection with the second embodiment moisture detector 4-2. Conductive material 46 can be disposed on substrate 104 in the manner described above in connection with moisture detector 4-2 to avoid undesirable electromagnetic interference from affecting the operation of moisture detector 4-3. Similarly, electrically conductive coating 48 can be utilized with the third embodiment moisture detector 4-3 in the manner described above in connection with the second embodiment moisture detector 4-2 including substrate 104.

Alternatively, substrate 104 can be omitted and the conductors comprising the third embodiment moisture detector 4-3 can be disposed directly on one or more surfaces of glass ply 10, glass ply 12 and/or interlayer 14 in any desired arrangement deemed suitable by one of ordinary skill in the art. In one desirable configuration, temperature sensor 122 is disposed on the same surface of glass ply 10, glass ply 12 or interlayer 14 as the conductors of the third embodiment moisture detector 4-3. Electrically conductive coating 48 can also be utilized with the third embodiment moisture detector 4-3 where the conductors thereof are disposed directly on one or more surfaces of glass ply 10, glass ply 12 and/or interlayer 14.

Figure 9:
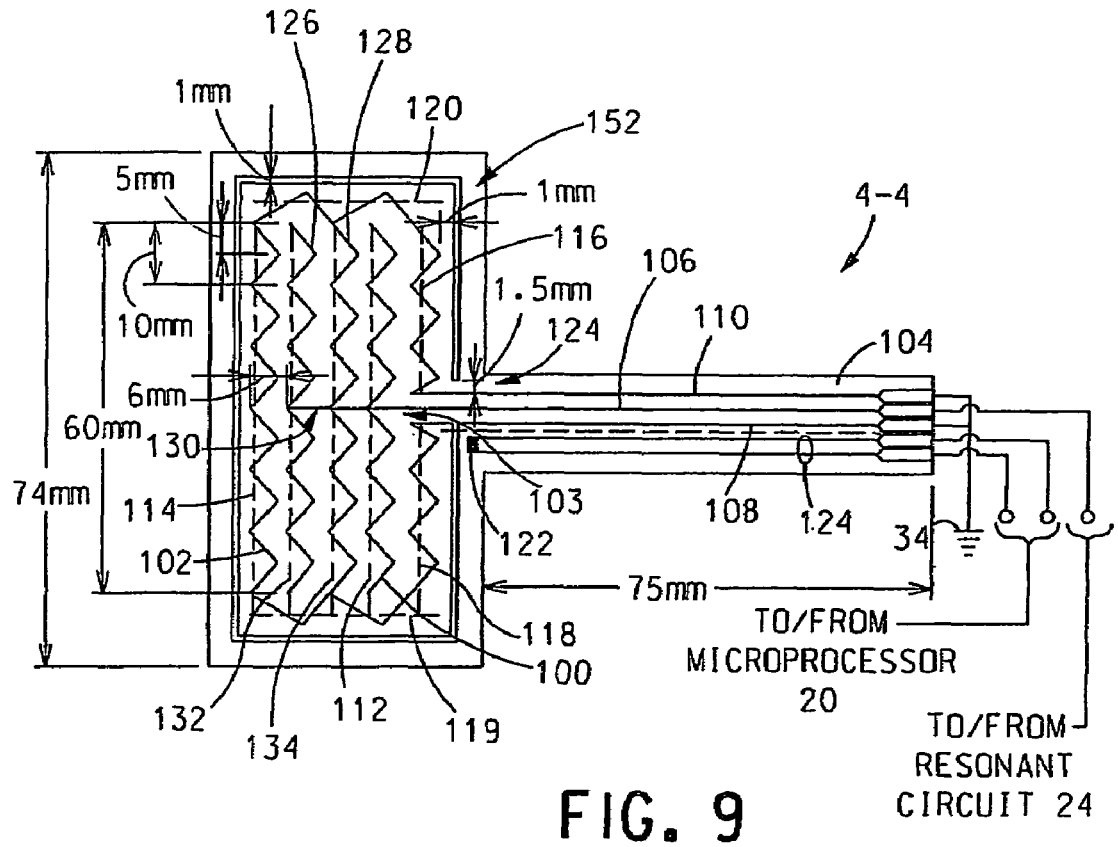
FIG. 9 is a plan view of a fourth embodiment moisture detector for detecting moisture on the sheet.

With reference to FIG. 9, and with continuing reference to FIGS. 1-8, a fourth embodiment moisture detector 4-4 is similar to the third embodiment moisture detector 4-3 described above except that the fourth embodiment moisture detector 4-4 also includes a third conductor 126 disposed on substrate 104 between first conductor 100 and the portion of second conductor 102 having longitudinal axis 114. Fourth embodiment moisture detector 4-4 also includes a fourth conductor 128 disposed on substrate 104 between first conductor 100 and third conductor 126. Fourth conductor 128 defines a gap 130 intermediate the opposite ends of fourth conductor 128 which are coupled to the portions of second conductor 102 having longitudinal axis 119 and 120 associated therewith. Third and fourth conductors 126 and 128 define longitudinal axes 132 and 134 that are positioned in substantially spaced parallel relation with longitudinal axis 112 of first conductor 100. The portions of second conductor 102 associated with longitudinal axes 114-118 along with conductors 100, 126 and 128 define zigzag paths along their longitudinal axes. These zigzag paths track each other in substantially spaced parallel relation along their longitudinal axes.

Portions of second conductor 102 spaced from opposite ends of first conductor 100 define longitudinal axes 119 and 120 that are positioned substantially perpendicular to longitudinal axis 112 of first conductor 100. The portions of second conductor 102 associated with longitudinal axes 119 and 120 define mirror image zigzag paths.

Power conductor 106 is connected to first conductor 100 intermediate the ends thereof via gap 103 between the ends of second conductor 102. Power conductor 106 is also connected to third conductor 126 intermediate the ends thereof via gap 130 between the ends of fourth conductor 128. Like the third embodiment moisture detector 4-3, ground conductors 108 and 110 are disposed on substrate 104 and are electrically connected to opposite ends of second conductor 102.

Desirably, temperature sensor 122 is disposed on substrate 104 in operative relation to, for example, second conductor 102.

Fourth embodiment moisture detector 4-4 including substrate 104 can be sandwiched between glass plies 10 and 12 in the manner discussed above in connection with the second embodiment moisture detector 4-2. Conductive material 46 can be disposed on substrate 104 in the manner described above in connection with moisture detector 4-2 to avoid undesirable electromagnetic interference from affecting the operation of moisture detector 4-4. Similarly, electrically conductive coating 48 can be utilized with the fourth embodiment moisture detector 4-4 including substrate 104 in the manner described above in connection with the second embodiment moisture detector 4-2.

Alternatively, substrate 104 can be omitted and the conductors comprising the fourth embodiment moisture detector 4-4 can be disposed directly on one or more surfaces of glass ply 10, glass ply 12 and/or interlayer 14 in any desired arrangement deemed suitable by one of ordinary skill in the art. In one desirable configuration, temperature sensor 122 is disposed on the same surface of glass ply 10, glass ply 12 or interlayer 14 as the conductors of the fourth embodiment moisture detector 4-4. Electrically conductive coating 48 can also be utilized with the fourth embodiment moisture detector 4-4 where the conductors thereof are disposed directly on one or more surfaces of glass ply 10, glass ply 12 and/or interlayer 14.

Some exemplary dimensions of fourth embodiment moisture detector 44 are shown in FIG. 9. These exemplary dimensions are also applicable to the third embodiment moisture detector 4-3. However, these dimensions are not to be construed as limiting the invention.

Figure 10:
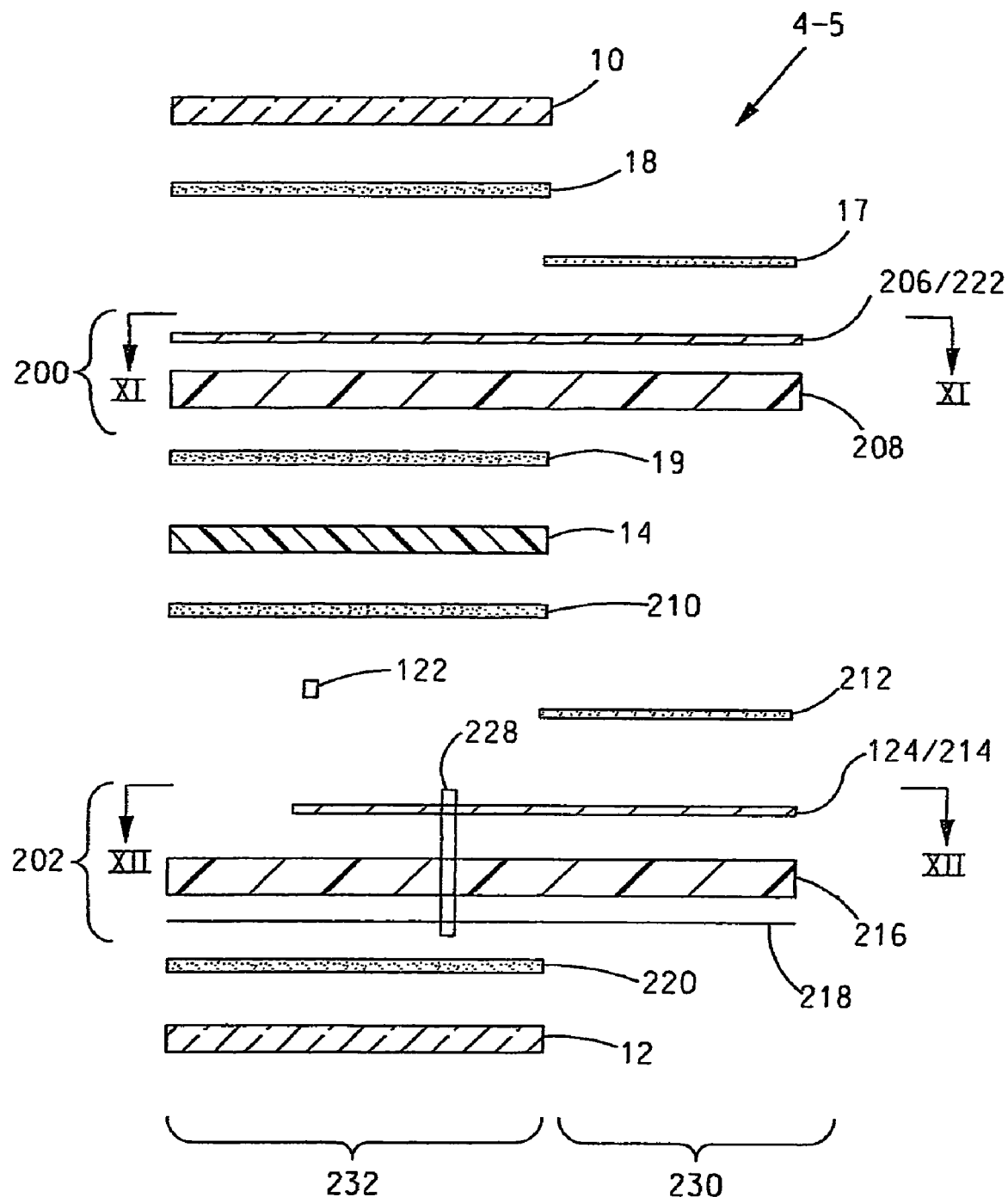
FIG. 10 is an exploded side view of a fifth embodiment moisture detector for detecting moisture on the sheet.

A fifth embodiment moisture detector 4-5 is shown in FIG. 10. Although not required, this particular embodiment can be used, e.g. if insufficient spacing exists between conductor(s) 6 acting as a resonating element and either conductive material 46 (FIG. 6) or electrically conductive coating 48 (FIG. 7) acting as a Faraday shield to avoid undesirable electromagnetic interference from affecting the operation of electrical conductor(s) 6 as a moisture detection element.

Fifth embodiment moisture detector 4-5 includes a first printed circuit 200 and a second printed circuit 202 configured to be sandwiched between outer glass ply 10 and inner glass ply 12 with plastic interlayer 14 acting as a spacing layer between first and second flexible printed circuits 200 and 202. In one nonlimiting embodiment. Circuit 200 and/or circuit 202 are flexible printed circuits. More specifically, between outer glass ply 10 and inner glass ply 12, fifth embodiment moisture detector 4-5 includes in the following order: first flexible printed circuit 200, pressure sensitive adhesive 19, plastic interlayer 14, a pressure sensitive adhesive 210, temperature sensor 122 and second flexible printed circuit 202. First flexible printed circuit 200 includes conductor(s) 206 and guard trace(s) 222 disposed on an insulative substrate 208 that is desirably flexible. Second flexible printed circuit 202 includes conductors 124 and 214 disposed on one side of an insulative substrate 216 that is desirably flexible and a conductive layer 218 disposed on a side of insulative substrate 216 opposite conductors 124 and 214. In one nonlimiting embodiment, conductive layer 218 is a layer of indium-tin oxide that acts as a Faraday shield for the fifth embodiment moisture detector 4-5.

As shown in FIG. 10, thermoset adhesive 18 is positioned between outer glass ply 10 and conductor(s) 206 and/or guard trace(s) 122 disposed on insulative substrate 208 while thermoset adhesive 220 is positioned between conductive layer 218 and inner glass ply 12.

Figure 12:
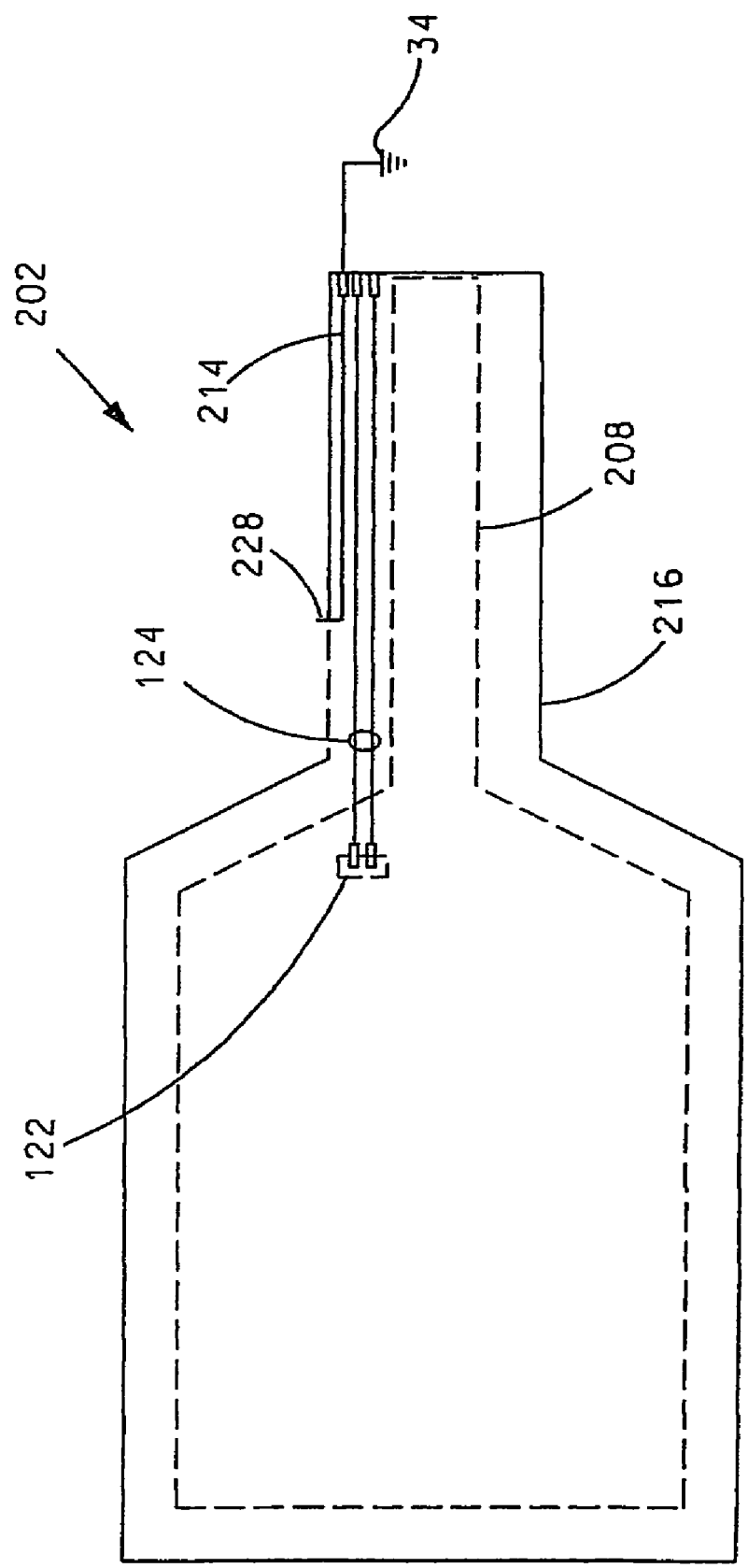
FIG. 12 is a view taken along lines XII-XII in FIG. 10.

With reference to FIG. 12 and with continuing reference to FIG. 10, second flexible printed circuit 202 also includes a connecting conductor 228 that runs between and electrically connects conductive layer 218 to conductor 214. The portion of insulative substrate 208 of first flexible printed circuit 200 that extends outside the periphery of ply 10 and/or ply 12 can have conductors 206 and guard traces 222 sandwiched between insulative substrate 208 and insulative material 17 in the same manner that electrical conductors 6 are sandwiched between flexible substrate 16 and insulative material 17 in the embodiment of the moisture detector shown in FIG. 6. Similarly, the portion of insulative substrate 216 of second flexible printed circuit 202 extending outside the periphery of ply 10 and/or ply 12 can have electrical conductors 124 and 214 sandwiched between insulative substrate 216 and insulative material 212. Insulative material 212 can be any suitable and/or desirable insulative material that acts to protect conductors 124 and 214. In one nonlimiting embodiment, insulative material 212 is made from the same material as insulative material 17. However, this is not to be construed as limiting the invention. Desirably, one end of insulative material 212 terminates between glass plies 10 and 12 in the same manner as an end of insulative material 17 does in the embodiments of the moisture detector 4 shown in FIGS. 4, 6 and 7. Thermoset adhesive 210 can cover the end of insulative material 212 sandwiched between glass plies 10 and 12 in the same manner that thermoset adhesive 18 covers the end of insulative material 17 sandwiched between glass plies 10 and 12 as shown in FIGS. 4, 6 and 7.

Insulative substrates 208 and 216 can be made from the same material as flexible substrate 16. However, this is not to be construed as limiting the invention. Moreover, conductors 206, 222, 124 and 214 can be formed on insulative substrates 208 and 216 in the manner described above in connection with the formation of conductor(s) 6 and 7 on substrate 2 of the second embodiment moisture detector 4-2. Accordingly, details of how the pattern of electrical conductors 206, 222, 124 and 214 are formed on insulative substrates 208 and 216 will not be described herein to avoid unnecessary redundancy.

Figure 11:
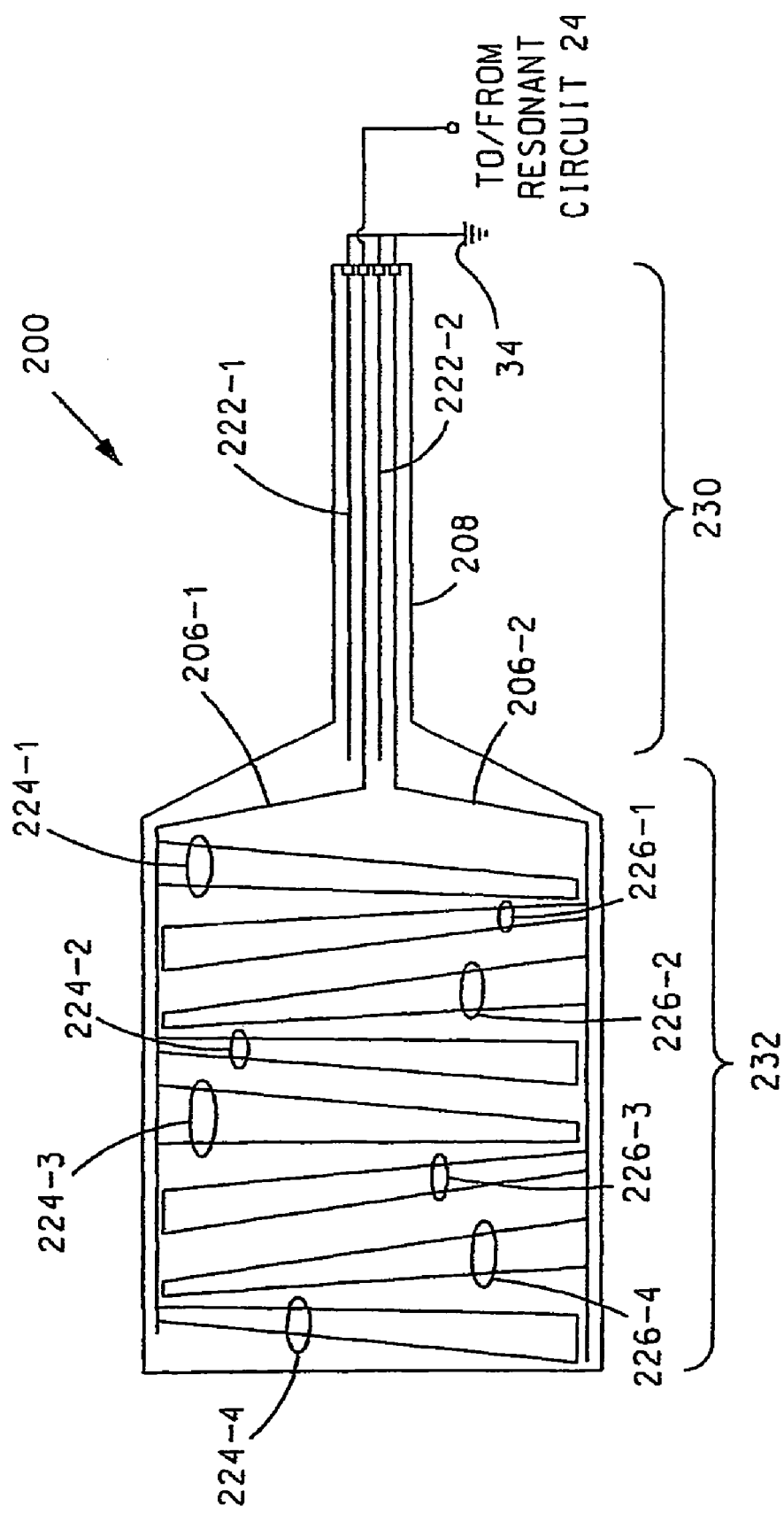
FIG. 11 is a view taken along lines XI-XI in FIG. 10.

With reference to FIG. 11 and with continuing reference to FIG. 10, conductor(s) 206 of first flexible printed circuit 200 includes conductors 206-1 and 206-2 arranged as shown on insulative substrate 208 which includes a narrow section 230 and a wide section 232. Narrow section 230 supports conductors 206-1 and 206-2 and guard traces 222-1 and 222-2 in spaced relation between opposite ends thereof. Each guard trace 222 terminates in or adjacent to wide section 232 as shown and thereby acts to at least partially shield the length of conductor 206-1 extending therebetween from undesired electromagnetic effects.

Within or adjacent wide section 232, conductors 206-1 and 206-2 transition from their spaced relation in narrow section 230 to adjacent opposite sides of wide section 232.

Within wide section 232, each conductor 206 includes a number of fingers that extend between the sides of insulative substrate 208. Specifically, conductor 206-1 defines a plurality of fingers 224-1-224-4 that extend from a first side of wide section 232 toward a second side of wide section 232, while conductor 206-2 includes a plurality of fingers 226-1-226-4 that extend from the second side of wide section 232 toward the first side of wide section 232.

Each finger 224 and 226 has an elongated quadrilateral shape. The end portions of fingers 224-1-224-4 defined by the extension of conductor 206-1 parallel to the first side of wide section 232 are alternatingly wide and narrow, while the ends of fingers 224-1-224-4 adjacent the second side of wide section 232 are alternatingly narrow and wide. Similarly, the end portions of fingers 226-1-226-4 defined by the extension of conductor 206-2 parallel to the second side of wide section 232 are alternatingly narrow and wide, while the ends of fingers 226-1-226-4 adjacent the first side of wide section 232 are alternatingly wide and narrow.

The sides of fingers 224-1 and 224-3 run generally in the same direction. Similarly, the sides of the following pairs of fingers run substantially in the same direction: 224-2 and 224-4; 226-1 and 226-3; and 226-2 and 226-4. Moreover, the sides of fingers 224-2 and 224-3 that face each other run substantially parallel to each other, while the sides of fingers 224-2 and 224-3 that face away from each other run substantially parallel to each other. Similar comments apply in respect of the sides that face each other and the sides that do not face other of the following pairs of fingers 224-1 and 224-2; 224-3 and 2244; 226-1 and 226-2; 226-2 and 226-3; and 226-3 and 226-4.

As shown in FIG. 11, fingers 224 and 226 are interdigitated. More specifically, the pair of fingers 226-1 and 226-2 are positioned between fingers 224-1 and 224-2; the pair of fingers 224-2 and 224-3 are positioned between fingers 226-2 and 226-3; and the pair of fingers 226-3 and 226-4 are positioned between fingers 224-3 and 2244.

With reference to FIG. 12 and with continuing reference to FIGS. 10 and 11, desirably, insulative substrate 216 of second flexible printed circuit 202 is larger than insulative substrate 208 (shown in phantom in FIG. 12) of first flexible printed circuit 200 whereupon all or a majority of insulating substrate 208 is aligned within the perimeter of insulating substrate 216 such that the electromagnetic shielding effect of conductive layer 218 on conductors 206-1 and 206-2 is optimized. In FIG. 12, the position of temperature sensor 122 on insulative substrate 216 and its connections to conductors 124 are shown. The connection of temperature sensor 122 to suitable processing circuitry via conductors 124 will be discussed in greater detail hereinafter. The phantom outline of insulative substrate 208 on insulative substrate 216 also shows the relative position of temperature sensor 122 with respect to insulative substrate 208.

With reference back to FIG. 11, guard traces 222 and conductor 206-2 are desirably connected to reference voltage 34, while conductive trace 206-1 is connected to a resonant circuit 24 described hereinafter. Similarly, as shown in FIG. 12, conductor 214 and, hence, conductive layer 218 and connecting conductor 228 are connected to reference voltage 34 too.

As can be seen from FIGS. 10-12, fifth embodiment moisture detector 4-5 provides a greater distance between conductive layer 218 acting as a Faraday shield and conductors 206 acting as the moisture detection element than the other embodiment moisture detectors 4-1-4-4 described herein. This additional distance improves the ability of fifth moisture detector 4-5 to detect the presence of moisture on windshield 2 while avoiding the effects of unwanted electromagnetic fields thereon.

Figure 13:
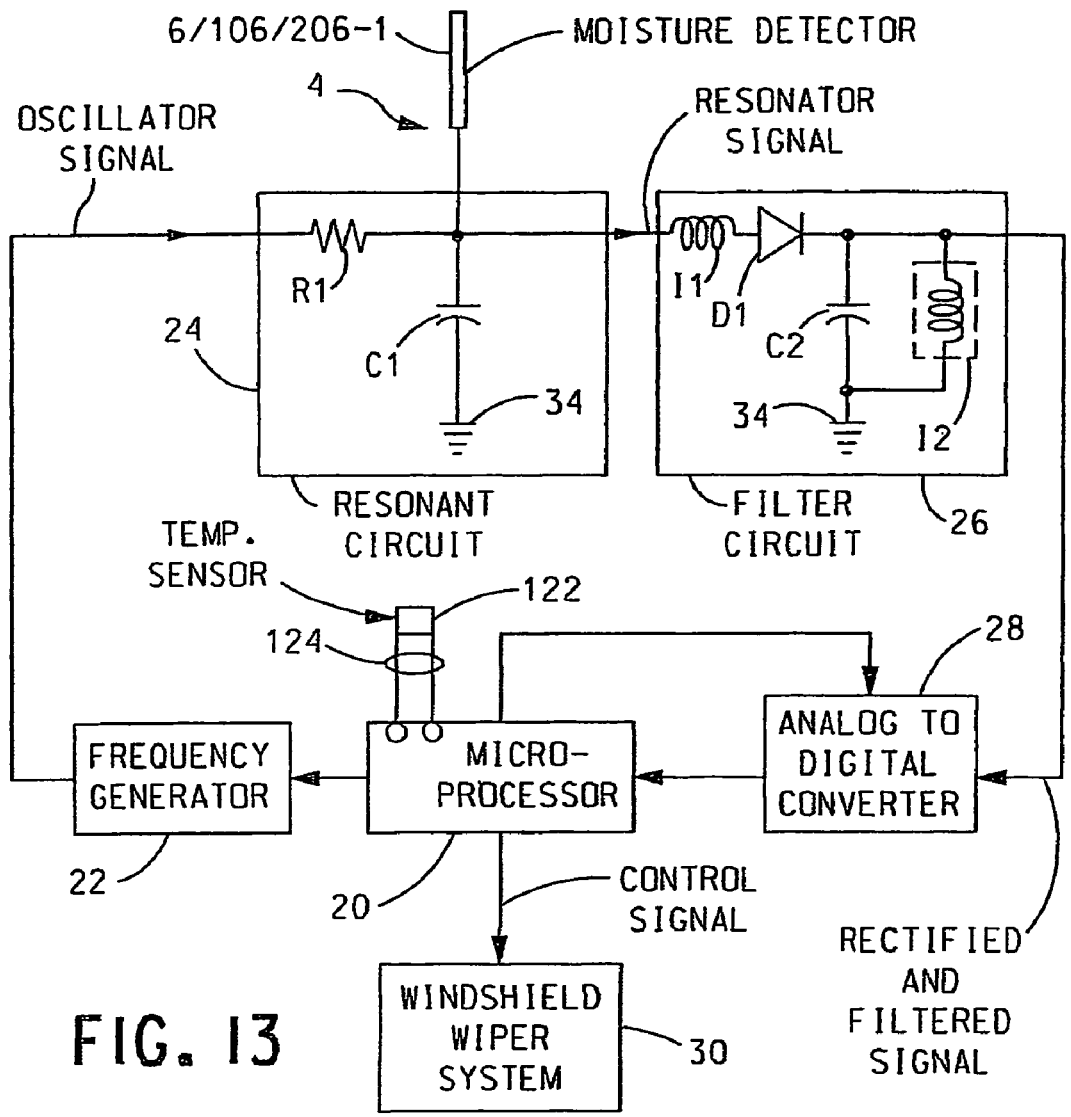
FIG. 13 is a schematic drawing of circuitry utilized to stimulate and detect the response of any one of the first through fifth embodiment moisture detectors.

With reference to FIG. 13 and with continuing reference to all previous figures, the electronic circuitry coupled to electrical conductor 6 of moisture detector 4-1 or 4-2, to power conductor 106 of moisture detector 4-3 or 4-4, or to conductor 206-1 of moisture detector 4-5 includes a microprocessor 20, a frequency generator 22, a resonant circuit 24, a filter circuit 26, and an analog-to-digital converter 28. A windshield wiper system 30 is connected to receive from microprocessor 20 one or more control signals which control the operation of windshield wiper system 30 in a manner to be described hereinafter.

Microprocessor 20 is interfaced with certain electronic hardware, such as ROM memory, RAM memory, I/O buffers, clock circuitry, and the like, which have not been included in FIG. 13 for simplicity of illustration. Microprocessor 20 operates under the control of a software program stored in a memory connected to microprocessor 20. Under the control of this software program, microprocessor 20 causes frequency generator 22 to output an oscillator signal having a predetermined amplitude and a predetermined frequency. This predetermined frequency is desirably between 300 kHz and 700 kHz and, more desirably, between 400 kHz and 600 kHz. The oscillator signal is supplied to resonant circuit 24 which is coupled to electrical conductor 6 of moisture detector 4-1 or 4-2, to power conductor 106 of moisture detector 4-3 or 4-4, or to conductor 206-1 of moisture detector 4-5. In response to receiving this oscillator signal, resonant circuit 24 outputs a resonator signal to electrical conductor 6 of moisture detector 4-1 or 4-2, to power conductor 106 of moisture detector 4-3 or 4-4, or to conductor 206-1 of moisture detector 4-5.

In one exemplary, non-limiting embodiment, resonant circuit 24 includes resistor R1 and capacitor C1 connected in series as shown. Electrical conductor 6 of moisture detector 4-1 or 4-2, power conductor 106 of moisture detector 4-3 or 4-4, or conductor 206-1 of moisture detector 4-5 is electrically connected to a node of capacitor C1 and resistor R1.

In one exemplary, non-limiting embodiment, filter circuit 26 includes a coke coil I1 and diode D1 connected in series to conduct the resonator signal from resonant circuit 24 toward analog-to-digital converter 28 and a capacitor C2 is connected between a side of diode D1 opposite resonant circuit 24 and reference voltage 34. Optionally, an inductor I2 is connected in parallel with capacitor C2. The output of filter circuit 26 is a rectified and filtered signal which is supplied to digital-to-analog converter 28. Under the control of microprocessor 20, analog-to-digital converter 28 samples the rectified and filtered signal and converts into an equivalent digital signal which is sampled by microprocessor 20.

In the following description, moisture detector 4 will be utilized. It is to be understood, however, that any one of moisture detectors 4-1 through 4-5 can be substituted for moisture detectors 4.

In order to detect the presence of moisture on windshield 2, microprocessor 20 causes frequency generator 22 to generate the oscillator signal when no moisture is present on an outward facing surface of windshield 2. Microprocessor 20 then determines the response of moisture detector 4 to the oscillator signal by sampling a first digital signal output by analog-to-digital converter 28 when moisture detector 4 is receiving the oscillator signal. Microprocessor 20 stores this first digital signal for future use.

Next, when moisture, e.g., condensed or diffused liquid such as water, is present on the outward facing surface of windshield 2, microprocessor 20 samples a second digital signal output by analog-to-digital converter 28 when moisture detector 4 is receiving the oscillator signal.

Alternatively, microprocessor 20 can sample the first digital signal when moisture e.g., condensed or diffused liquid such as water, is present on the outward facing surface of windshield 2 and can sample the second digital signal when no moisture is present on the outward facing surface of windshield 2. To this end, the first digital signal, corresponding to the presence or absence of moisture on windshield 2, can be utilized as the basis for determining from the second digital signal when moisture is present on or absent from windshield 2. The use of the first and second digital signals to determine the presence or absence of moisture on windshield 2 will be described hereinafter.

It has been observed that the rectified and filtered signal output by filter circuit 26 has a different amplitude when moisture is present on windshield 2 adjacent moisture detector 4. More specifically, the rectified and filtered signal output by filter circuit 26 has an amplitude that increases or decreases to a limit with increasing moisture on windshield 2 adjacent moisture detector 4. For example, in the absence of moisture on windshield 2 adjacent moisture detector 4, the rectified and filtered signal has a first amplitude. However, when moisture in the form of droplets of water is present on windshield 2 adjacent moisture detector 4, the rectified and filtered signal output by filter circuit 26 has a second amplitude different than the first amplitude. Furthermore, when moisture in the form of diffused water is present on windshield 2 adjacent moisture detector 4, the rectified and filtered signal output by filter circuit 26 has a third amplitude different than the second amplitude.

This changing amplitude is caused by the impedance of moisture detector 4, changing due to increasing or decreasing amounts of moisture on windshield 2 adjacent moisture detector 4. More specifically, the impedance of moisture detector 4 decreases in response to increasing amounts of moisture on windshield 2 adjacent moisture detector 4, whereupon the amplitude of the rectified and filtered signal output by filter circuit 26 decreases. Similarly, the impedance of moisture detector 4 increases in response to decreasing amounts of moisture on windshield 2 adjacent moisture detector 4, whereupon the amplitude of the rectified and filtered signal output by filter circuit 26 increases.

The electronic circuitry coupled to moisture detector 4 can detect changes in the impedance thereof due to changes in the moisture on windshield 2 adjacent moisture detector 4 between no moisture and diffused liquid.

Next, microprocessor 20 compares the first digital signal to the second digital signal to determine an amount of moisture that is present on windshield 2 adjacent moisture detector 4. More specifically, microprocessor 20 takes the difference between the first and second digital signals and determines therefrom an amount of moisture that is present on windshield 2 adjacent moisture detector 4. Based on this determination, microprocessor 20 outputs a control signal to windshield wiper system 30 for controlling the operation thereof based on the amount of moisture on windshield 2.

Figure 14:
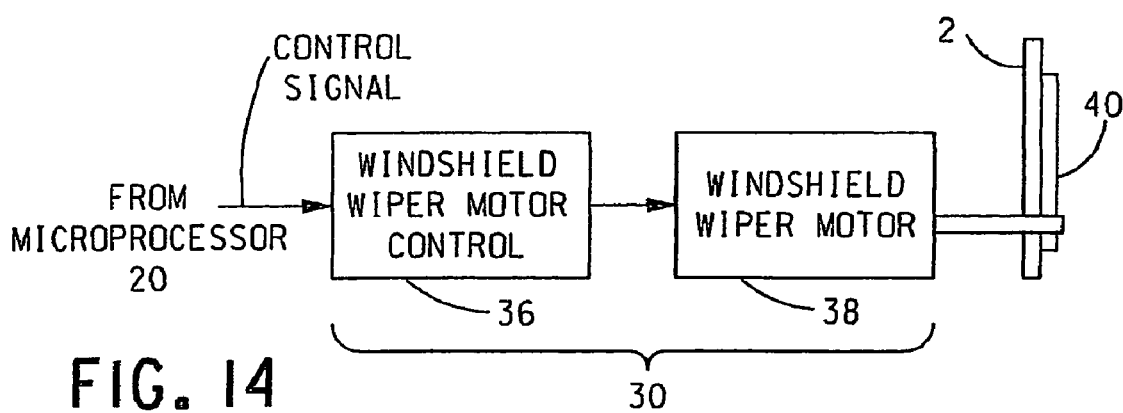
FIG. 14 is a schematic drawing of the windshield wiper system shown in FIG. 13.

With reference to FIG. 14 and with continuing reference to all previous figures, windshield wiper system 30 includes a windshield wiper motor control 36 which receives the control signal from microprocessor 20, and a windshield wiper motor 38 which is coupled to a windshield wiper blade 40 disposed on windshield 2. As discussed above, the control signal supplied by microprocessor 20 to windshield wiper motor control 36 is related to the difference between the first and second digital signals sampled by microprocessor 20. In order to control windshield wiper system 30 in accordance with the amount of moisture on windshield 2 adjacent moisture detector 4, the numerical range of digital difference values that can be processed by microprocessor 20 is divided into sections based on the desired control of windshield wiper system 30. For example, if the range of digital difference values is divided into two sections, the section corresponding to the upper numerical range of difference values corresponds to operating windshield wiper system 30 at a high speed while the lower numerical range of difference values corresponds to operating windshield wiper system 30 at a low speed. Thus, if a difference value between a current sample of the second digital signal and the first digital signal is within the upper numerical range of difference values, microprocessor 20 outputs the control signal which causes windshield wiper motor control 36 to control windshield wiper motor 38 to operate windshield wiper blade 40 at a high speed. Similarly, if the difference value between the current sample of the second digital signal and the first digital signal is within the lower numerical range of difference values, microprocessor 20 outputs the control signal which causes windshield wiper motor control 36 to control windshield wiper motor 38 to operate windshield wiper blade 40 at a low speed.

Various other modes of operation of windshield wiper system 30 can also be enabled by microprocessor 20 and windshield wiper motor control 36 as a function of the difference value between a current sample of the second digital signal and the first digital signal. These modes can include a single pulse mode where windshield wiper blade 40 is caused to wipe windshield 2 once, e.g., to remove dew or mist from windshield 2; a continuous duty cycle pulse mode, e.g., where there is a steady accumulation of water droplets on windshield 2, but the accumulation is not sufficient enough to warrant operation of windshield wiper system 30 at the low speed; and a variable duty cycle pulse mode where wiping of windshield 2 by windshield wiper blade 40 varies as a function of the amount and/or rate of moisture accumulation on windshield 2.

Microprocessor 20 can be configured to output two or more different control signals which cause windshield wiper system 30 to implement two or more of the above modes of operation in response to varying amounts of moisture on windshield 2. In the absence of moisture on windshield 2, microprocessor 20 can cause windshield wiper system 30 to either discontinue or not initiate the wiping of windshield 2 with windshield wiper blade 40.

It has been observed that the temperature of windshield 2 can affect the sensitivity of each embodiment moisture detector 4 discussed above. Accordingly, a temperature sensor, like temperature sensor 122 described above, can be disposed on or adjacent one of the surfaces of glass ply 10, glass ply 12, or plastic interlayer 14, or on or adjacent flexible substrate 16, 104, or 208 disposed in windshield 2 in order to detect the temperature of windshield 2 on or adjacent moisture detector 4.

In operation, when moisture detector 4 is disposed on windshield 2 or on flexible substrate 16, 104 or 208 disposed on windshield 2 and temperature sensor 122 is disposed in operative relation to moisture detector 4 for measuring a temperature on or adjacent moisture detector 4, microprocessor 20 determines the response of moisture detector 4 to the oscillator signal output by frequency generator 22 by sampling one or more digital signals output by analog-to-digital converter 28 when moisture detector 4 is receiving the oscillator signal. On or about the time microprocessor 20 samples each digital signal output by analog-to-digital converter 28, microprocessor 20 measures a property of temperature sensor 122 that varies in response to the temperature on or adjacent temperature sensor 122. As a function of this measured property, microprocessor 20 applies a correction factor to each digital signal received by microprocessor 20 from analog-to-digital converter 28. The correction factor applied to each digital signal received by microprocessor 20 adjusts the value of the digital signal for the measured temperature on or adjacent moisture detector 4, whereupon the control signal output by microprocessor 20 to windshield wiper system 30 is adjusted for temperature, thereby avoiding inadvertent operation or non-operation of windshield wiper system 30. Thus, windshield wiper system 30 is operated as a function of the measured properties of moisture detector 4 and temperature sensor 122.

In the embodiment of the electronic circuitry shown in FIG. 10, temperature sensor 122 is illustrated as being connected directly to microprocessor 20, as would be the case if microprocessor 20 included an internal analog-to-digital converter (not shown) coupled to temperature sensor 122 via conductors 124. However, this is not to be construed as limiting the invention since it is envisioned that temperature sensor 122 can be connected to analog-to-digital converter 28 via a multiplexer (not shown) under the control of microprocessor 20 for switching either temperature sensor 122 or the rectified and filtered signal output by filter circuit 26 into electrical communication with analog-to-digital converter 28. Also or alternatively, analog-to-digital converter 28 can be representative of a pair of analog-to-digital converters, one of which is connected to temperature sensor 122 and the other of which is connected to the rectified and filtered signal output by filter circuit 26. Accordingly, the illustration of temperature sensor 122 connected to microprocessor 20 via conductors 124 is not to be construed as limiting the invention.

Desirably, temperature sensor 122 is a thermistor that has a resistance that changes as a function of the temperature. Alternatively, temperature sensor 122 can be a bimetallic junction temperature sensor or a conductor having a resistance that changes as a function of the temperature, or, an optical temperature sensor that optically detects the temperature of windshield 2 on or adjacent moisture detector 4 by optical means, and which outputs to microprocessor 20 a signal indicative of the thus detected temperature.

Figure 15A:
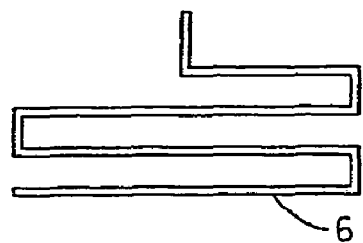
FIGS. 15a-15d show alternate embodiments of the electrical conductor of the first and second embodiment moisture detectors.
Figure 15B:
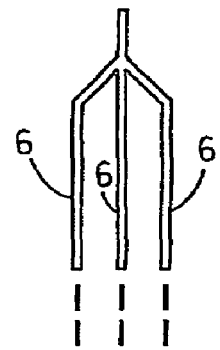
Figure 15C:
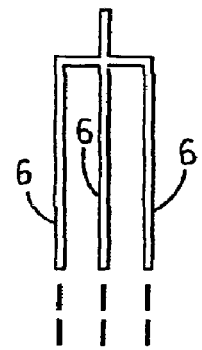
Figure 15D:
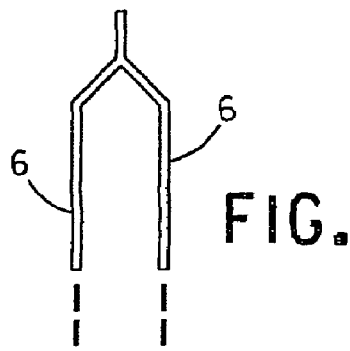

With reference to FIGS. 15a-15d, various different embodiments of electrical conductor 6 of the first and second embodiments of moisture detectors 4-1 and 4-2 are illustrated. FIG. 15a and FIG. 5 show electrical conductor 6 formed in a serpentine pattern. FIGS. 15b and 15c show three parallel electrical conductors 6 extending in spaced relation from a common junction. As indicated by the dashed extensions of electrical conductors 6 in FIGS. 15b and 15c, electrical conductors 6 can be formed to any desired length. Lastly, in FIG. 15d, two parallel electrical conductors 6 extend in spaced relation from a common junction. Again, the dash lines extending from electrical conductors 6 in FIG. 15d indicate that electrical conductors 6 can have any desired length.

The present invention has several advantages over prior art systems for detecting moisture. These advantages include moisture detector 4 being essentially invisible to the naked eye from about one meter; moisture detector 4 can be disposed in a clear or non-transparent part of windshield 2; moisture detector 4 is not sensitive to dirt; moisture detector 4 can detect the presence of moisture over a larger area than prior art sensors of comparable size; moisture detector 4 is useful with substrates of various thickness and composition; moisture detector 4 is more uniformly responsive than prior art sensors; and moisture detector 4 can detect the presence of moisture droplets of smaller size, e.g., dew or mist, on windshield 2 than the prior art systems for detecting moisture.

Figure 16:
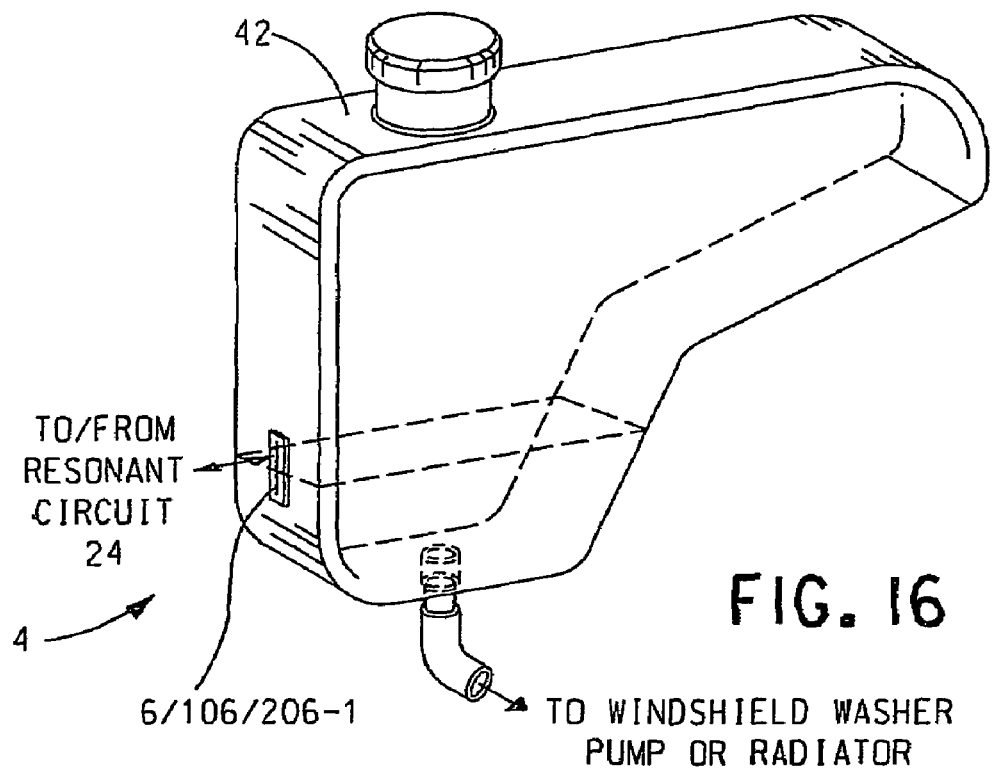
FIG. 16 is an isolated perspective view of a fluid reservoir of a vehicle including any one of the first through fifth embodiment moisture detectors disposed thereon.

With reference to FIG. 16 and with reference back to FIG. 13, the present invention can also be utilized to detect a level of one or more fluids, such as the level of a fluid in a vehicle. Specifically, moisture detector 4 can be mounted on an electrically and magnetically nonconductive fluid reservoir 42. Preferably, moisture detector 4 is mounted on an exterior of fluid reservoir 42 adjacent a lower end thereof. However, this is not to be construed as limiting the invention. Fluid reservoir 42 can be configured to receive windshield washer fluid, radiator fluid, or any other fluid utilized by a vehicle, the level of which fluid can be measured utilizing moisture detector 4 and the electronic circuitry shown in FIG. 13.

In order to detect the level of fluid in fluid reservoir 42, the oscillator signal is supplied to electrical conductor 6, 106 or 206-1 of moisture detector 4 when no fluid is received in fluid reservoir 42. A first response of moisture detector 4 is sampled and stored for later use. At suitable times when fluid is received in the fluid reservoir, plural second responses of moisture detector 4 to the oscillator signal are sampled. Each second response is compared to the first response. When a second response has a predetermined relation to the first response, the electronic circuitry outputs a corresponding control signal which activates a suitable indicator, e.g., "check washer fluid", "check radiator fluid", etc.

It is to be appreciated that decreasing the fluid level in fluid reservoir 42 decreases the difference between the first response and the second response of moisture detector 4. Thus, when the second response has the predetermined relation to the first response indicative of the fluid level decreasing to a predetermined level, the electronic circuitry outputs the control signal. To facilitate detecting the change in the resonant frequency of moisture detector 4, the predetermined frequency of the oscillator signal can be selected to optimize the change in resonant frequency of moisture detector 4 in response to the presence of fluid in fluid reservoir 42. Similar comments apply in respect of the change in resonant frequency of moisture detector 4 due to the presence of moisture on windshield 2.

When a vehicle includes multiple moisture detectors 4, a multiplexer (not shown) can be connected between each moisture detector 4 and the electronic circuitry shown in FIG. 13. Under the control of microprocessor 20, the multiplexer can selectively connect the electronic circuitry to each moisture detector 4 for supplying the oscillator signal at an appropriate frequency to each moisture detector 4 and for detecting the response of each moisture detector 4 to the supplied oscillator signal. Preferably, under the control of its software program, microprocessor 20 can adjust the frequency of the oscillator signal output by frequency generator 22 to optimize the change in the resonant frequency of each moisture detector 4 to detect the presence or absence of a particular fluid.

The invention has been described with reference to the preferred embodiments. Obvious modifications and alterations will occur to others upon reading and understanding the preceding detailed description. For example, while described in connection with the detection of moisture on windshield 2, the present invention can also be utilized to detect moisture on surfaces of rigid or flexible substrates utilized in connection with other applications. Similarly, while described in connection with detection of fluid levels in a fluid reservoir 42 mounted on a vehicle, the present invention can also be utilized to detect the level of a fluid received in a fluid reservoir utilized in other applications. Moreover, while described in connection with the control of windshield wiper system 30, microprocessor 20 can also be utilized to control a vehicle headlamp system, a vehicle windshield dehumidification system and/or any other vehicle or non-vehicle based system that it is desired to control as a function of the presence of moisture on a substrate. Still further, while the various components of the electronic circuitry are preferably connected by conductors, it should be appreciated that suitable signals can be conveyed between two or more of these components via suitable radio frequency (RF) and/or optical signal means. Microprocessor 20 can also be configured to record for subsequent retrieval and display, the days when moisture is detected on a substrate and/or the extent of operation of windshield wiper system 30. This information can then be used for information purposes, e.g., to determine the number of days in a month it rains, and/or to estimate when blades of the windshield wiper system 30 may require replacement. It is intended that the invention be construed as including all such modifications and alterations insofar as they come within the scope of the appended claims or the equivalents thereof.

The invention claimed is:

1. A moisture detection system comprising:
a moisture detector including a first electrical conductor disposed on a surface of a first substrate and having a resonant frequency that varies as a function of an amount of moisture present adjacent the first electrical conductor, an electrically conductive layer disposed on the surface of a second substrate, and a spacing layer disposed between the first and second substrates for maintaining at least portions of the first electrical conductor and the electrically conductive layer in spaced relation;
an oscillator which outputs an oscillator signal at a predetermined frequency;
a resonator circuit coupled to the first electrical conductor and responsive to the oscillator signal for outputting a resonator signal having an amplitude related to the resonant frequency of the first electrical conductor and the predetermined frequency;
a filter circuit responsive to the resonator signal for outputting a rectified and filtered signal;
an analog-to-digital converter responsive to the rectified and filtered signal for outputting a digital signal related to the rectified and filtered signal; and
a controller responsive to the digital signal for causing another system to operate in accordance with the digital signal.

2. The system of claim 1, wherein the other system is a wiper system that is responsive to the controller for adjusting a rate moisture is removed from adjacent the first electrical conductor as a function of an amount of moisture present adjacent the first electrical conductor and/or a rate moisture accumulates adjacent the first electrical conductor.

3. The system of claim 1, wherein at least part of the moisture detector is laminated between a pair of transparent sheets.

4. The system of claim 3, wherein the part of the moisture detector where the portions of the first electrical conductor and the electrically conductive layer are maintained in spaced relation by the spacing layer is laminated between the pair of transparent sheets.

5. The system of claim 1, wherein at least one of the first and second substrates is flexible.

6. The system of claim 1, further including a second electrical conductor disposed on the surface of the first substrate, wherein:
each electrical conductor defines a plurality of spaced fingers; and
fingers of the first and second electrical conductors are interdigitated.

7. The system of claim 6, wherein:
a pair of fingers of the first electrical conductor is disposed in spaced relation between two pairs of fingers of the second electrical conductor; and
each pair of fingers of the second electrical conductor is disposed in spaced relation between the pair of fingers of the first electrical conductor and one other finger of the first electrical conductor.

8. The system of claim 6, wherein each finger has an elongated quadrilateral shape with the opposing ends thereof having different lengths.

9. The system of claim 6, further including a temperature sensor disposed on the second substrate for detecting a temperature adjacent one of the fingers of at least one of the electrical conductors.

10. A moisture detection system comprising:
a moisture detector including a spacing layer disposed between a first printed circuit layer having a first electrical conductor disposed on a surface of a substrate thereof and a second printed circuit layer having an electrically conductive layer disposed on the surface of a substrate thereof, the spacing layer maintaining at least a portion of the first electrical conductor and at least a portion of the electrically conductive layer in spaced relation;
an oscillator for outputting to the first electrical conductor an oscillator signal at a predetermined frequency;
circuitry responsive to the oscillator signal for outputting a resonator signal having an amplitude related to the resonant frequency of the first electrical conductor; and
circuitry responsive to the resonator signal for outputting a control signal related to an amplitude of the resonator signal.

11. The system of claim 10, wherein:
the first printed circuit layer includes a second electrical conductor disposed on the surface of the substrate thereof in spaced relation to the first electrical conductor; and
the second electrical conductor is coupled to a reference voltage.

12. The system of claim 10, wherein:
the first electrical conductor defines a first plurality of fingers that extend in spaced relation from an edge of the substrate of the first printed circuit layer;
the second electrical conductor defines a second plurality of fingers that extend in spaced relation toward the edge of the substrate of the first printed circuit layer; and the first and second plurality of fingers are interdigitated with each other.

13. The system of claim 12, wherein the first and second plurality of fingers are interdigitated as follows:
   a pair of fingers of the first electrical conductor is disposed in spaced relation between two pairs of fingers of the second electrical conductor; and
   each pair of fingers of the second electrical conductor is disposed in spaced relation between the pair of fingers of the first electrical conductor and one other finger of the first electrical conductor.

14. The system of claim 12, wherein:
   each finger has an elongated quadrilateral shape; and
   the opposing ends of each finger have different lengths.

15. The system of claim 10, wherein the surfaces on which the first electrical conductor and the electrically conductive layer are disposed face away from each other.

16. The system of claim 10, wherein the electrically conductive layer is indium-tin oxide.

17. The system of claim 10, wherein the combination of the first and second printed circuit layers and the spacing layer disposed therebetween is sandwiched between an inner glass ply and an outer glass ply of a vehicle windshield, with the first electrical conductor facing the outer glass ply and with the electrically conductive layer facing the inner glass ply.

18. The system of claim 10, wherein the electrically conductive layer is connected to a reference voltage.

19. A moisture detection system comprising a moisture detector including:
   a first electrical conductor;
   a first substrate having the first electrical conductor disposed on one surface thereof;
   a spacing layer coupled to the other surface of the first substrate;
   a second substrate having one surface thereof coupled to a surface of the spacing layer opposite the first substrate; and
   an electrically conductive layer disposed on a surface of a substrate opposite the spacing layer.

20. The system of claim 19, wherein the spacing layer is formed from an electrically non-conductive material.

21. The system of claim 19, further including a second electrical conductor disposed on the same surface of the first substrate as the first electrical conductor, wherein the first and second electrical conductors define interdigitated fingers.

* * * * *